US005311652A

United States Patent [19]

McConkey et al.

[11] Patent Number: 5,311,652

[45] Date of Patent: May 17, 1994

[54] METHOD OF IMPROVING THE SURFACE OF STEEL PIPE FOR CORROSION RESISTANT COATING

[75] Inventors: Stephen E. McConkey, Calgary; Guntrum N. Franzky, Lisle, both of Canada

[73] Assignee: Shaw Industries Ltd., Toronto, Canada

[21] Appl. No.: 888,115

[22] Filed: May 26, 1992

[51] Int. Cl.[5] ..................... B23P 25/00; B21C 43/00; B24C 3/10; B21J 1/00

[52] U.S. Cl. .................................. 29/81.04; 29/81.12; 29/90.7; 29/DIG. 19; 29/DIG. 36; 51/417; 72/53

[58] Field of Search ................. 29/81.01, 81.02, 81.03, 29/81.04, 81.05, 81.12, DIG. 19, DIG. 36, 90.7; 15/236.1, 304, 104.04; 51/411, 420, 417; 118/317, 318, 319, 320; 427/195, 327, 387; 72/53

[56] References Cited

U.S. PATENT DOCUMENTS 611,900 10/1898 Garland et al. ................ 29/81.09 X
1,743,623 1/1930 Ross ......................... 29/DIG. 36 X
2,353,125 7/1944 Carpmail ........................ 29/81.02 X
3,073,022 1/1963 Bush et al. ................ 29/DIG. 36 X
4,222,205 9/1980 Lake et al. ............................ 51/420
4,531,253 7/1985 Cottam ........................... 15/236.1
4,704,986 11/1987 Remp et al. ......................... 118/318
4,821,545 4/1989 Druelle et al. ................... 29/90.7 X
5,216,849 6/1993 Clack et al. ........................... 51/417

FOREIGN PATENT DOCUMENTS 133802 10/1980 Japan ................................. 29/81.12
1600890 10/1990 U.S.S.R. ............................. 29/81.12

*Primary Examiner*—Peter Dungba Vo
*Attorney, Agent, or Firm*—Ridout & Maybee

[57] ABSTRACT

Surface anomalies on pipe are removed preparatory to corrosion coating. The removal is conducted by brushing with wire brush elements or COMAX brush elements which may rotate about axes parallel to the pipe axis or substantially radially off the pipe. Both kinds of brush elements may be used in combination. Before subjecting the pipe to brushing, the surface is particulate blasted to remove ferric oxide and better expose surface anomolies. After wire brushing, the surface is again particulate blasted to provide an anchor pattern of indentations promoting adhesion of the coating.

13 Claims, 5 Drawing Sheets

METHOD OF IMPROVING THE SURFACE OF STEEL PIPE FOR CORROSION RESISTANT COATING

The present invention relates to a method of preparing the surface of steel pipe for corrosion resistant coating and apparatus for use in carrying out the method.

Frequently it is desired to apply a protective coating, for example, a fusion bonded epoxy coating, on the exterior of a steel pipe in order to protect it from corrosion.

Steel pipe frequently has surface irregularities in basically two main forms, namely, surface laminations and slivers. When the coating is applied over this area, the coating tends to be somewhat thinner over the raised portions and as a result, the coated pipe may fail quality testing.

SUMMARY OF THE INVENTION

The present invention provides a method of improving the surface of steel pipe for a coating comprising:

(a) subjecting the surface of the pipe to particulate blasting to remove substantially all ferric oxide therefrom;

(b) applying to said blasted surface a wire brush element comprising wires extending generally radially with respect to the pipe and having free wire ends adjacent the pipe surface, biasing the free ends of the wireds into abrasive engagement with the pipe surface, and rotating the wires relative to the pipe surface to abrade off substantially all surface anomalies from the pipe and provide a substantially smoothly curved abraded pipe surface; and (c) subjecting said abraded surface to particulate blasting to form an anchor pattern therein providing a profile for a coating.

The invention also provides an apparatus for preparing the surface of steel pipe for a coating comprising:

(a) means for conveying pipe longitudinally along a conveying axis;

(b) first and second particulate blasters spaced apart along said path for blasting the surface of said pipe; and (c) a brush station comprising of wire brushes disposed between said first and second blasters, said brushes having wires extending generally radially with respect to said axis and having free wire ends disposable adjacent the surface of said pipe, means for biasing the free ends of the wires into abrasive engagement with the pipe surface, and means for rotating the wires relative to the pipe surface to abrade off substantially all surface anomalies from the pipe and provide a substantially smoothly curved abraded pipe surface.

The brush elements employed may comprise wires rotating about an axis extending substantially parallel to the conveying axis of the pipe or about an axis extending substantially radially thereof. Alternatively, one or more brush elements with a rotational axis extending parallel to the pipe axis may be used in combination with one or more brush elements extending with a rotational axis radially. These arrangements have been found to be effective in removing surface anomalies and in providing the pipe with a smoothly curved surface free from slivers or like raised portions or anomalies.

The initial particulate blasting of the pipe removes the outer ferric oxide layer and exposes said surface irregularities, anomalies or imperfections in addition to forming a series of indentations in the surface, but these are largely or completely removed by the wire brushing process. After the wire brushing, the pipe is subjected to a further step of particulate blasting in order to form an anchor pattern in the pipe surface which promotes strong adhesion between the coating and the pipe.

The method of the present invention will be described in more detail, by way of example only, with reference to the accompanying drawings herein.

DETAILED DESCRIPTION

Figure 1:
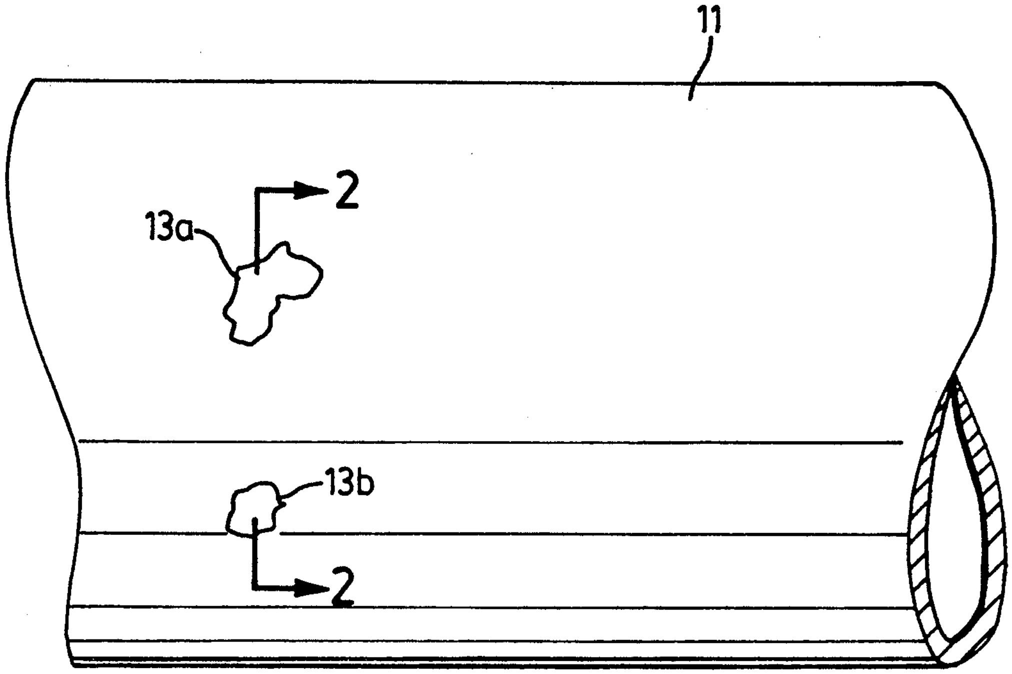
FIG. 1 is a fragmentary perspective view of a pipe having two anomalies on its surface.
Figure 2:
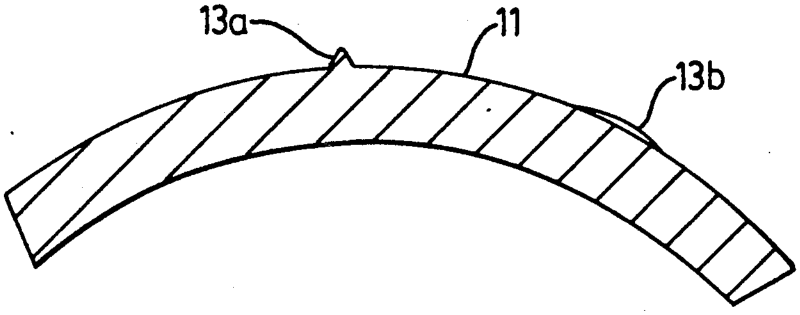
FIG. 2 is a section taken in the line 2—2 in FIG. 1.

Referring to the drawings, FIGS. 1 and 2 show a steel pipe 11 having on its surface anomalies 13*a* and 13*b*, referred to as a "sliver" and as a "lamination" respectively. If such pipe is coated with an even thickness of a coating, such as an extruded polyethylene or other thermoplastic coating, the coating is thin in the area overlying the portions 13*a* and 13*b*, and as a result, does not meet necessary coating specifications.

Figure 3:
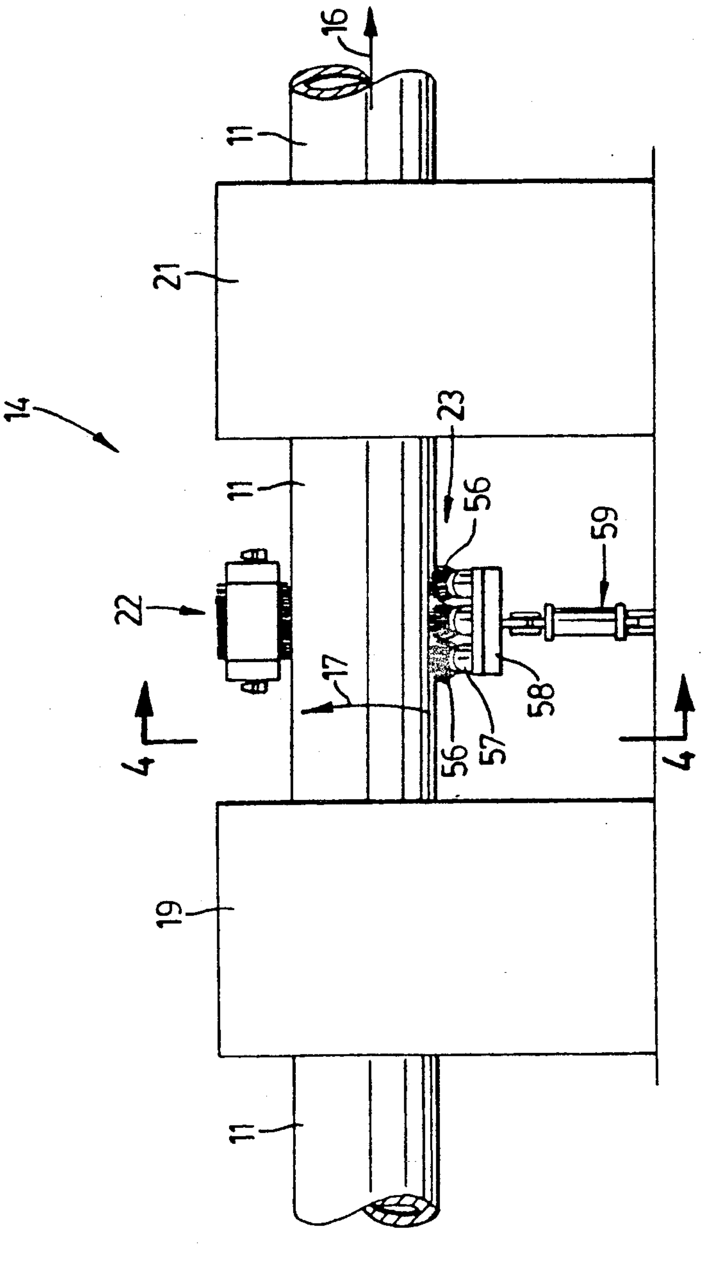
FIG. 3 is a side view of apparatus used in carrying out the method.

In FIG. 3, the pipe 11 is shown as it is fed through a treatment station 14. As the pipe is fed axially in the direction of the arrow 16 a spin is imparted to it about its axis, for example in the direction of the arrow 17. Various known forms of pipe rotation and conveying means may be employed. For example, the pipe 11 may be supported and conveyed on drive wheels, such as the wheels 18 shown in broken lines FIG. 5, which rotate about parallel axes inclined to the axis of the pipe 11. Typically, for pipe 4" to 48" in diameter, the linear speed of the pipe will be about 10 to 30 feet per minute, and the rotational speed may be about 20 to 100 r.p.m.

As a result, any point on the surface of the pipe follows a helix, in this example a left-handed helix, the pitch of which is dependent on the position of the wheels on conveyor.

The pipe passes through first and second horizontally spaced particulate blasting machines 19 and 21. The blasting machines 19 and 21 may be of conventional type and may be, for example sand, grit or shot blasting machines. Preferably, they are grit blasting machines such as the machines available under the trade-mark WHEELABRATOR from Wheelabrator Canada Inc., Milton, Ontario, Canada. The blasting is conducted with sufficient intensity within the period of dwell of the pipe 11 within machine 19 that substantially all ferric oxide is removed from the pipe surface.

Following the blasting, pipe 11 is preferably subjected to two types of wire brushing in order to remove surface anomalies such as slivers amd laminations and providing the pipe with a substantially uniform external shape so that the pipe surface is smooth and free of surface defects.

Figure 4:
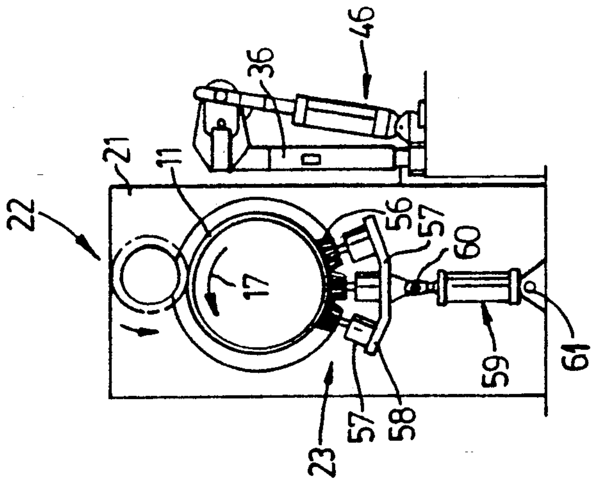
FIG. 4 is an end view partly in section or the line 4—4 in FIG. 3.

The brushing may be effected with one or more brush elements as indicated at 22, and as shown in more detail in FIGS. 7 to 10, having wire pins rotating about an axis parallel to the pipe axis, and/or with one or more elements such as the elements indicated at 23, having wire elements rotating about on axis or axes extending generally radially of the pipe 11. As illustrated in FIGS. 3 and 4, in the preferred form, brush elements such as the element 22 are used in combination with the wire brush elements 23, since the brush elements 22 have better performance in removal of the surface imperfections known as "laminations", whereas the elements 23 aid in removal of slivers.

Figure 9:
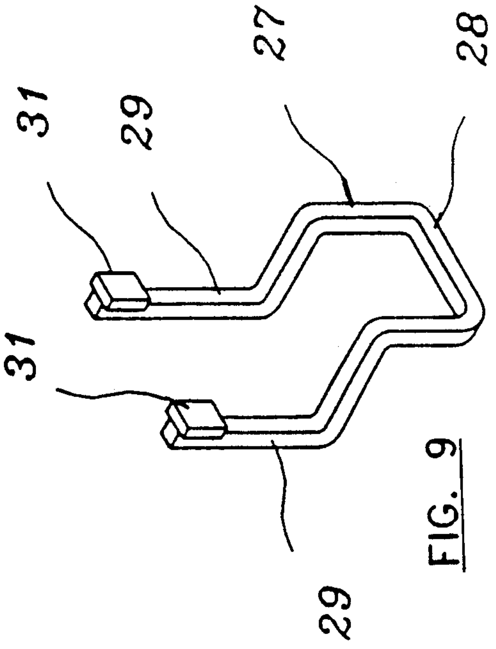
FIG. 9 is a perspective view on an enlarged scale of a carbide tipped pin element of the brush element of FIG. 8.
Figure 10:
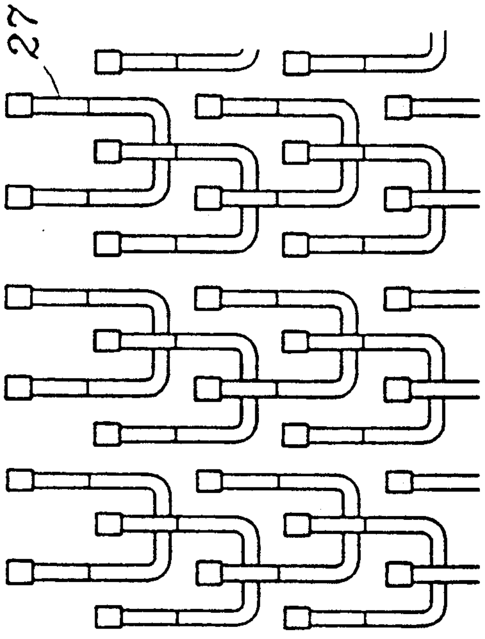
FIG. 10 is a partially schematic plan view showing the arrangement of the pin elements on the brush element in FIG. 8.
Figure 8:
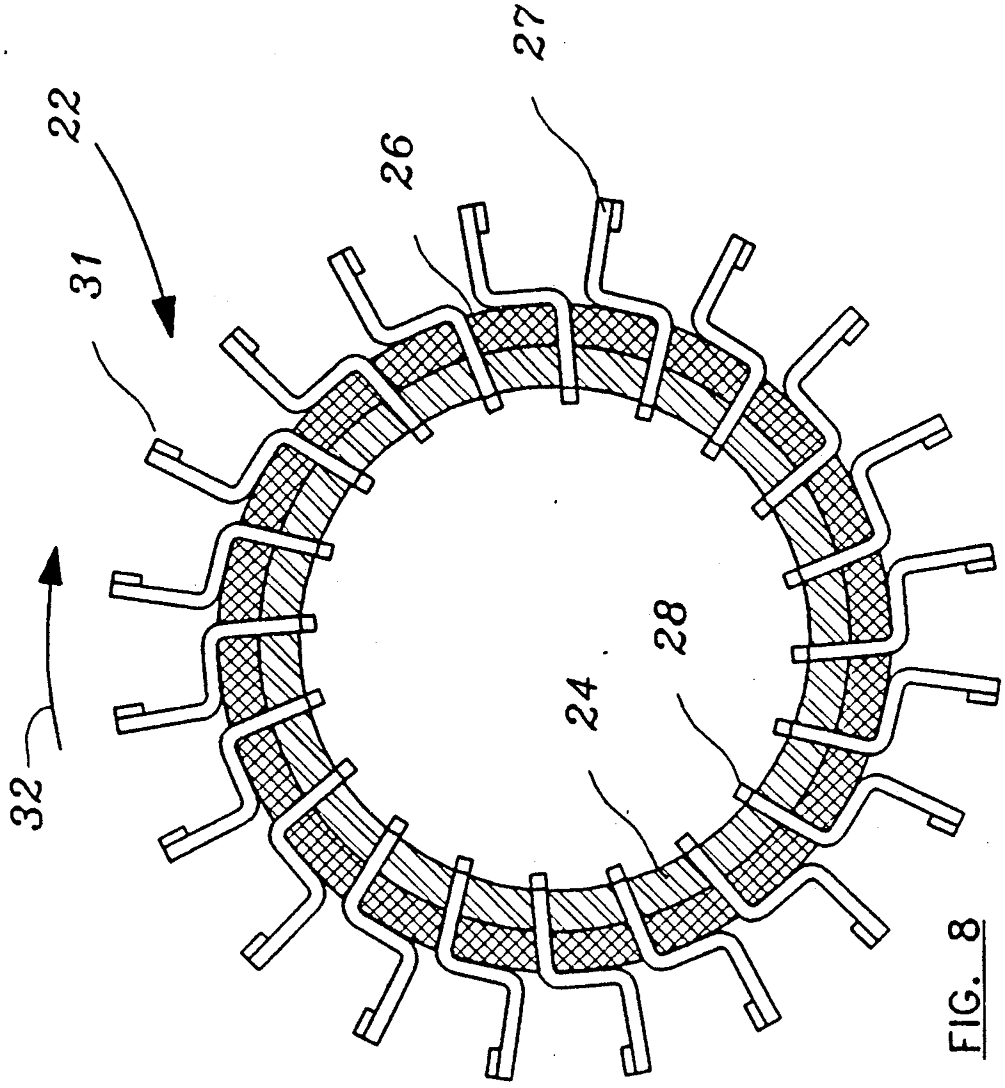
FIG. 8 is a vertical section taken through a preferred form of brush element of the apparatus of FIGS. 5–7.

As shown in FIGS. 8 to 10 in more detail, element 22 comprises a cylindrical hollow structural core 24, for example aluminum or steel and an outer resilient sleeve 26, for example rubber, holding bent steel wire pins 27. Each pin 27 comprises a transverse portion 28 and end portions 29 extending substantially perpendicularly relative to the transverse portion 28. As seen in FIG. 8, the transverse portion 28 of each pin is disposed on the inner side of the core 24 and the end portions 29 extend through openings in the core 24 and sleeve 26. As shown in FIG. 10, the pins 27 are arranged in rows extending axially of the core 24, with each pin 27 in each row being staggered with respect to the pins of the adjacent rows, so that the end portion 29 are distributed evenly over the cylindrical surface. Preferably, a hard cutting tip 31, for example of tungsten carbide, is provided on one side of each free end of each end portion 29. The wire of the pins 27 is relatively thick and does not tend to flex when the element 22 is rotated in the sense indicated by the arrow 32 in FIG. 8 and is pressed into engagement with the pipe surface 11. Instead, the pin tends to rock bodily about the point of contact of the base of the end portions 29 with the resilient sleeve 26 and the transverse portions 28 lifting against the inner surface of core 24 tending to retain them. As a result, the hard carbide tips 31 are presented to the metal of the pipe 11. One preferred form of brush element 22 as shown in FIGS. 8 to 10 is available commercially under the trademark COMAX. As seen in FIG. 4, preferably the element 22 and pipe 11 are rotated in the same sense, to increase the relative surface speed between the tips 31 and the pipe 11.

Figure 6:
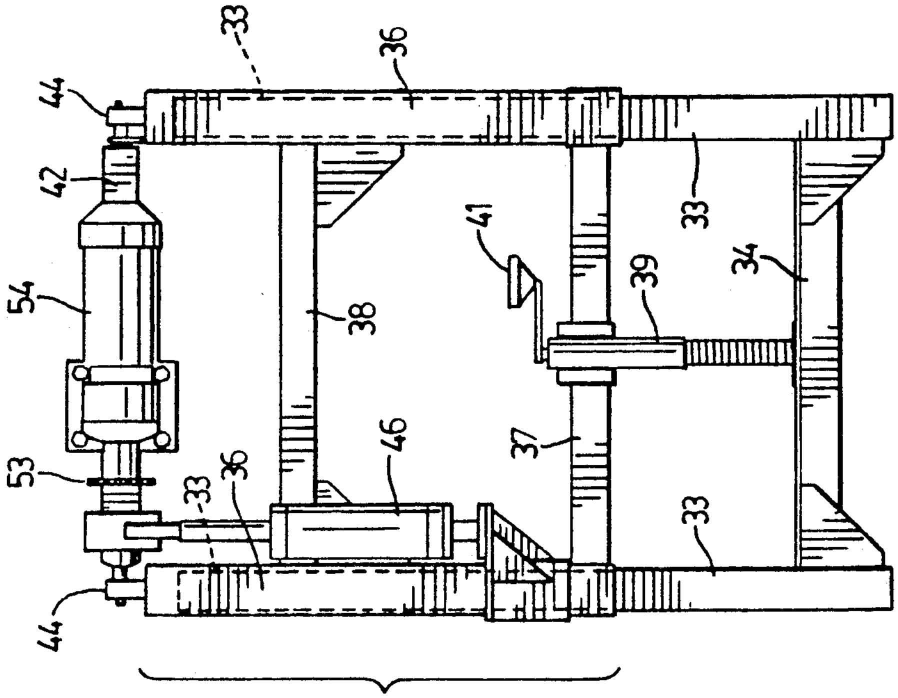
FIGS. 5, 6 and 7 are end, side and perspective views, respectively, of brushing apparatus used in the apparatus of FIG. 3.
Figure 5:
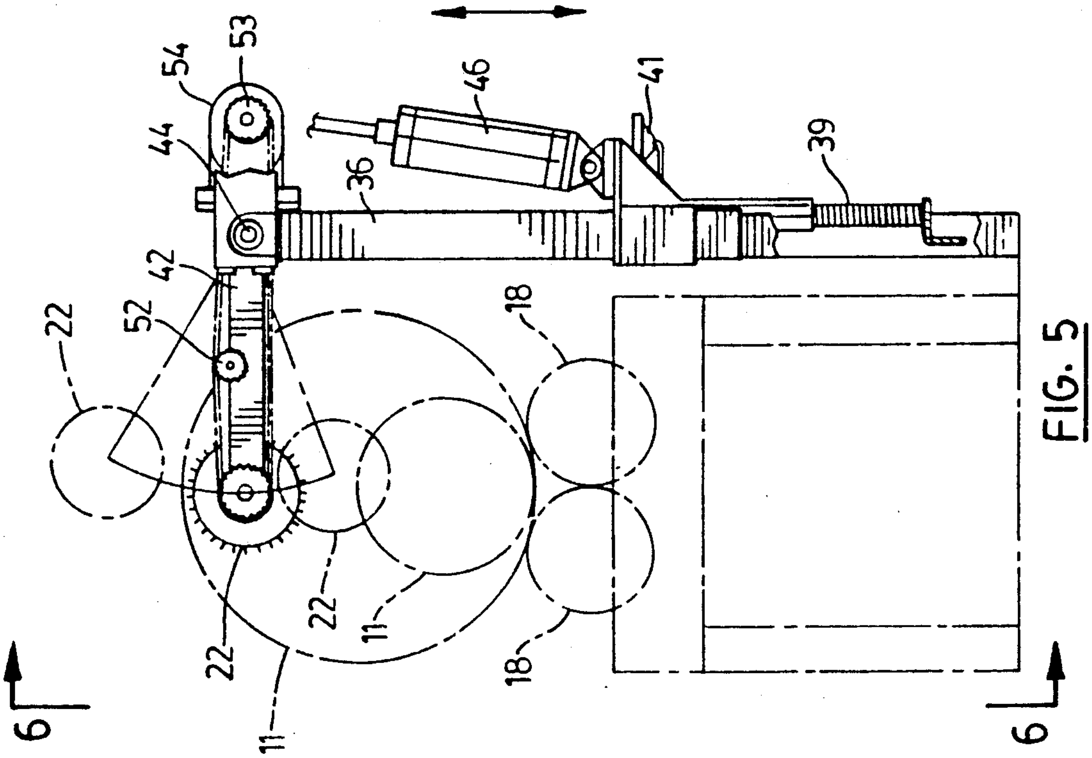
Figure 7:
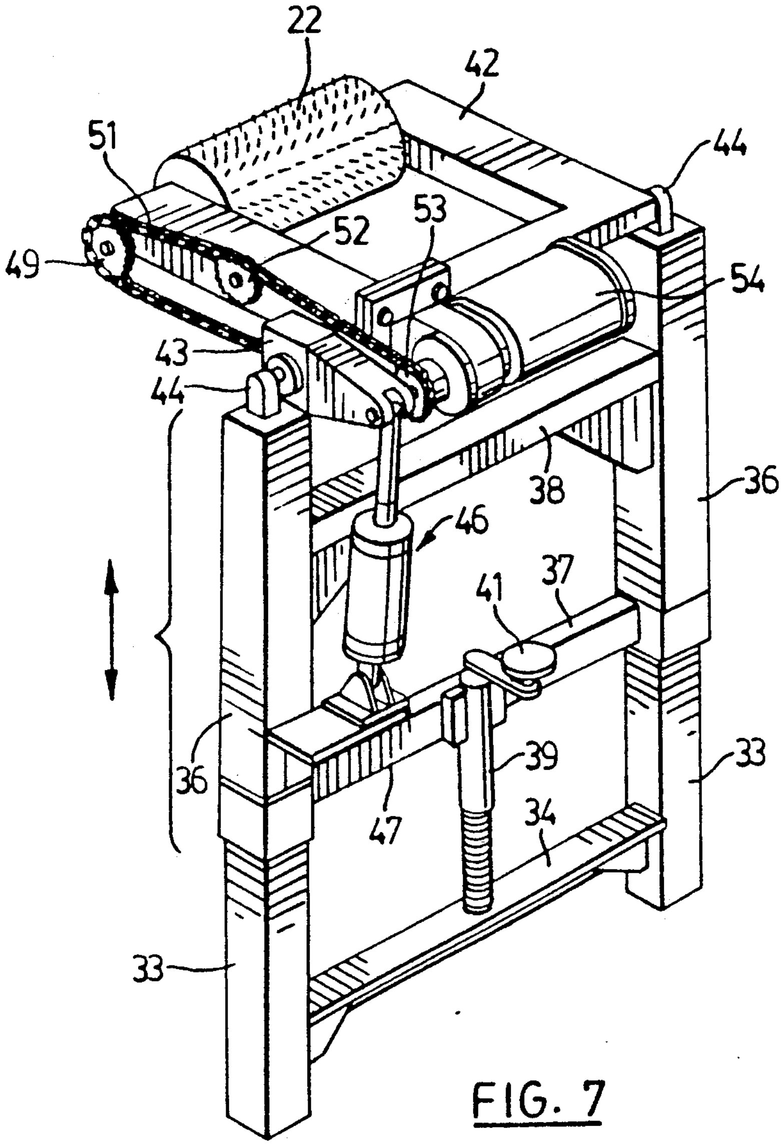

FIGS. 5, 6 and 7 show a preferred arrangement for the support of the element 22 so that it may be applied to pipes 11 of differing diameters preferably in the range 4" to 48" outside diameter. The support comprises two parallel vertical rails 33 connected by a cross piece 34 at the bottom. Two hollow side supports 36 slide over the sides 33 and are connected by intermediate and upper cross pieces 37 and 38. A screw jack 39 or other elevating means is connected between the cross pieces 36 and 37 so that by rotation of the handle 41, the supports 36 may be raised or lowered. The element 22 is journalled for rotation in a rectangular frame 42 on one side of which is connected a rearwardly extending arm 43. The arm 43 and opposite side of the rear portion of the frame 42 are journalled for pivoting movement relative to the side supports 36 at 44. A piston and cylinder 46 are pivotally connected between a platform 47 on the side support 33 and the rear end of one arm 43 whereby the element 22 together with the forward end of the frame 42 may be pivoted upwardly or downwardly by retracting or extending the piston relative to the cylinder.

A drive spindle connected to the element 22 is connected to a sprocket 49 driven by a chain 51 running over an idler sprocket 52 and driven by a drive sprocket 53 which is in turn driven by a motor 54. Preferably, the weight of the forward portion of the frame 42 and associated elements is such that there is a definite upward moment acting about the pivot axis 42 tending to bias the brush element 22 upwardly to prevent a pipe 11 (FIG. 5) travelling into element 22, during a lack of compressed air supply to the cylinder 46.

As illustrated in FIG. 5, at any given height of the frame 42, as adjusted by the screw jack 39, the element 22 may be rotated on an arc according to the extension or retraction of the cylinder and piston 46. The element 22 is forced downwardly into contact with the pipe 11 by pneumatic pressure applied to the cylinder and piston 46.

Preferably, the diameter of the brush element 22 measured from the outer tips of the wires, is about 5 to 15 inches, more preferably about 7 to about 12 inches, and the element 22 is rotated at a speed between about 200 and 1000 rpm, more preferably about 300 to 600 rpm. The pitch of the helical motion of the surface of the pipe 11 in relation to the axial length of the element 22 is preferably such that each point on the pipe's surface is traversed at least twice by the element 22. This arrangement is found to be effective in removing surface anomalies from the pipes. A plurality of the brush elements 22 may be applied to the surface of the pipe 11 at the treatment station 14.

In addition to, or instead of the element 22, wire brush elements as illustrated at 23 may be employed.

In the example illustrated, each element 23 comprises a conventional wire cup brush 56, comprising a circular base from the centre of which a spindle extends. A plurality of wires are connected to the base at points defining an annulus, with the wires extending generally parallel to the base opposite the spindle. The spindle of each brush 56 is connected to a drive, for example an individual hydraulic motor 57, whereby the brushes 56 may be rotated about their axes. In the example illustrated, the brushes 56 are mounted on a base 58 urged upwardly, so that the wires are biased into contact with the pipe 11, by a pneumatic piston and cylinder arrangement 59. In order that each portion of the pipe 11 is swept at least once and preferably twice by the element 23, a plurality, for example three as illustrated, brushes 56 are mounted on the base 58 in line axially, so that the axial extent of the array of brush elements 56 is at least as great as and preferably twice as great as the pitch of the helix described by any point on the pipe surface. In order to increase the period for which any point on the surface is in contact with the element 23, the brushes 56 are disposed in circumferentially extending rows, having in the example illustrated three of the brushes 56 in each row.

Preferably, the base 58 is pivoted to a clevis mount 60 of the cylinder rod, while the cylinder itself is pivoted to a base 61. In each row, the brushes 56 on either side of the centre line are elevated relative to and are inclined radially inwardly symmetrically with respect to the centre line. With this arrangement, the articulation of the element 23 relative to the surroundings allows limited deflection of the mounting for the element 23, against the action of the piston end cylinder arrangement 59, when the brush element encounters an irregularity on the pipe 11. The arrangement of the element 23 and the piston and cylinders exerts a self-centering action tending to retain the element 23 in engagement with the surface of the pipe 11 and in alignment with the axis of the pipe 11.

Preferably, the wire brushes 56 are 2 to 5 inches in diameter and they are rotated at about 500 to 2800 rpm, more preferably about 700 to about 2300 rpm. Again, it is found that the wire brush element 23 is very effective in removing slivers.

As will be appreciated, more than one set of the brush elements 23 may be employed at the treatment station.

It is found that depending on the type of the anomalies on the pipe, their abundance and hardness, in some cases brush elements of the type 22 wherein the wires rotate about an axis parallel to the pipe axis and, in some cases, brush elements of the type 23 wherein the wires rotate about axes extending generally radially of the pipe 11 are more effective in removing the anomalies and providing a smooth round surface and generally uniform outer dimensions for the pipe 11. In some instances, the best removal of anomalies is achieved when both type of brush element are employed. It is possible to determine by trial and experiments with a given batch of pipe which configuration of the wire brushing arrangements will give the best results in each case, since the forms of surface anomalies present tend to exhibit some consistency within a given batch.

Following the wire brushing, the pipe is subjected to particulate blasting in the blasting machine 21 which as described above may be similar to the machine 19 above and need not therefore be described again in detail.

Within the machine 21, the brushed pipe surface has imparted to it an indented fine anchor pattern in order to promote good adhesion of the coating which is to be applied subsequently. Preferably, the surface of the pipe is shot blasted to a minimum near white finish (Sa $2\frac{1}{2}$ or SSPC - SP10) to give an anchor pattern to a minimum depth of 40 microns.

We claim:

1. Method of improving a surface of steel pipe for coating comprising a sequence of the following steps:

(a) subjecting the surface of said pipe to particulate blasting to remove substantially all ferric oxide therefrom, thereby producing a blasted pipe surface;

(b) applying to said blasted surface a wire brush element comprising wires extending generally radially with respect to the pipe and having free wire ends adjacent the pipe surface, biasing the free ends of the wires into abrasive engagement with the pipe surface, and rotating the wires relative to the pipe surface to abrade off substantially all surface anomalies from the pipe and provide a substantially smoothly curved abraded pipe surface; and (c) subjecting said abraded surface to particulate blasting to form indentations therein thus providing an anchor for a plastic coating.

2. Method as claimed in claim 1 wherein said wire brush element comprises wires each comprising a transverse portion and two end portions extending substantially perpendicular with respect to the transverse portion, and a resilient mounting portion receiving each of said wires with the transverse portion disposed on a side of said mounting portion remote from the pipe surface and said end portions extending through said mounting portion.

3. Method as claimed in claim 2 wherein a hard cutting tip is connected on one side of each free end of said end portions.

4. Method as claimed in claim 2 wherein said pipe is rotated about its axis while being conveyed at a speed such that substantially all the surfaces of the pipe are traversed by wires of said brush element.

5. Method as claimed in claim 4 wherein said brush element comprises a support pivoting about a pivot axis parallel to the pipe axis, and means for adjusting the height of said pivot axis.

6. Method as claimed in claim 4 wherein said brush element is about 5 to about 15 inches in diameter and is rotated at a speed of about 200 to about 1000 rpm.

7. Method as claimed in claim 1 wherein said wire brush element comprises wires extending generally parallel to one another and disposed on a circular base rotating about its centre.

8. Method as claimed in claim 7 wherein said wire brush element comprises a wire cup brush.

9. Method as claimed in claim 7 wherein said brush is about 1 to about 8 inches in diameter and is rotated at a speed of about 500 to 2800 rpm.

10. Method as claimed in claim 7 wherein said pipe is rotated about its axis while being conveyed at a speed such that substantially all the surface of the pipe is traversed by wires of said brush element.

11. Method as claimed in claim 1 wherein a plurality of said wire brush elements are applied to said blasted pipe.

12. Method as claimed in claim 11 wherein a first and second wire brush element are applied to said blasted pipe, wherein said first brush element comprises a transverse portion and two end portions extending substantially perpendicular with respect to the transverse portion, and a resilient mounting portion receiving each of said wires with the transverse portion disposed on a side of said mounting portion remote from the pipe surface and said end portions extending through said mounting portion;

and wherein said second brush element comprises wires extending generally parallel to one another and disposed on a circular base rotating about its centre.

13. Method as claimed in claim 12 wherein said first brush element is cylindrical and is disposed substantially parallel to the axis of the pipe, and said second brush element is rotated about an axis extending substantially radially with respect to the axis of the pipe.

* * * * *